May 6, 1930.  E. W. STEVENS  1,757,444
TOOL RETAINER
Filed April 29, 1927
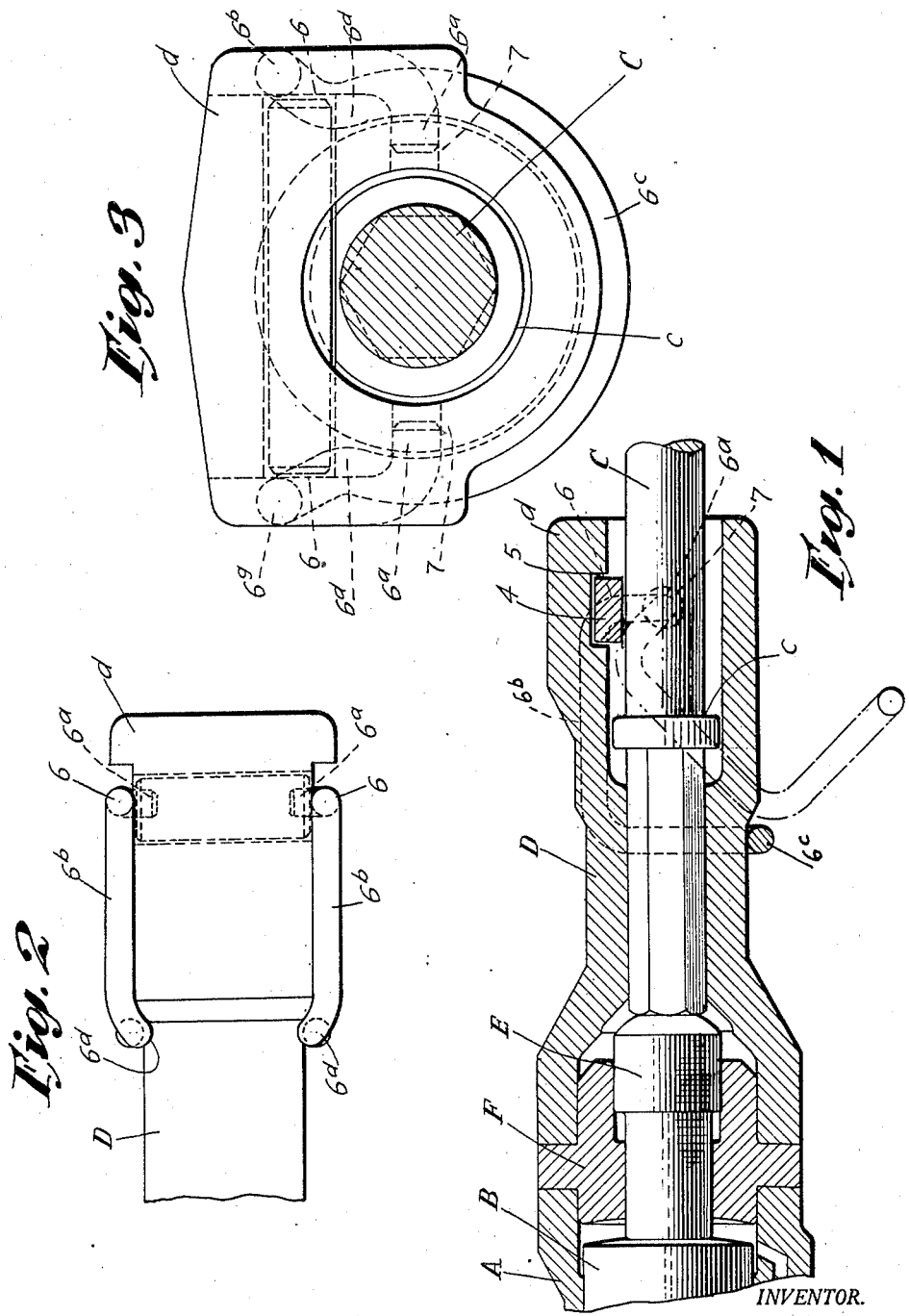
INVENTOR.
Edward W. Stevens
BY
Ira L. Nickerson
ATTORNEY.

Patented May 6, 1930

1,757,444

UNITED STATES PATENT OFFICE

EDWARD W. STEVENS, OF DETROIT, MICHIGAN, ASSIGNOR TO CHICAGO PNEUMATIC TOOL COMPANY, OF NEW YORK, N. Y., A CORPORATION OF NEW JERSEY

TOOL RETAINER

Application filed April 29, 1927. Serial No. 187,472.

This invention relates to percussive machines arranged to impart hammer blows to a working tool having a shank extending partly within a machine and provided with a collar or annular flange. More particularly the invention comprises means to retain the working tool in the machine, which means when used with drill steels and similar tools for drilling rock, pavement breaking, etc. are frequently referred to as steel pullers.

One object of the invention is to provide an improved retainer or puller arrangement for collared working tools. Another object is to securely hold such a tool in its chuck while facilitating its release in the event that the working tools are to be changed. Other objects will be apparent from the detailed description which follows.

In order to illustrate the invention, one concrete embodiment thereof is shown in the accompanying drawings in which:

Fig. 1 is a longitudinal sectional view of the front end of a percussive machine;

Fig. 2 is a top plan view of the forward end of the machine shown in Fig. 1; and Fig. 3 is a front end elevational view on an enlarged scale of the parts shown in Fig. 1.

The embodiment of the invention chosen for the purpose of illustration indicates at A (Fig. 1) the cylinder of a percussive machine of any suitable or desired type such as a pneumatic hammer or drill, having a hammer piston B arranged to impart blows to the end of the shank of a working tool, such as drill steel C. Steel C which has a projecting flange or collar $c$, is supported in a chuck formed by the front head D, which is secured to the percussive machine in any suitable manner, as by side or through bolts (not shown). Steel C may receive the blows of piston B either directly or through an interposed anvil block E which may be movably supported in a guide member or bushing F interposed between front head D and cylinder A.

The means for releasably retaining working tool C in the front head or chuck D comprises a transversely disposed member or block 4 arranged forwardly of and beyond collar $c$ of the drill steel and in a position to be engaged by the latter. To this end front head D has a transverse opening or bore 5 to receive retainer block 4, this opening being off center a sufficient amount to permit block 4 to clear the shank of tool C but to be disposed in the path of collar $c$. In this manner the working tool C is prevented from coming out of its socket or chuck in front head D until retainer block 4 is removed. Block 4 may be of any suitable or desired shape. In the present instance it is substantially rectangular in cross section as indicated in Fig. 1, and the opening or bore 5 in the front head is of corresponding shape.

To hold block 4 against accidental removal or displacement, means are provided on the front head D presenting barriers 6 at the ends of bore 5, such barriers being movable so as to release block 4 when it is desired to remove or insert a working tool. While barriers 6 may be separate elements, they preferably form integral portions of a keeper which straddles front head D. The keeper as shown is in the form of a bail pivotally mounted for swinging movement upon front head D, the pivots for the keeper being provided by inturned ends $6^a$ on the barrier portions 6 received in sockets or bores 7 in the front head (Fig. 3) preferably within the transverse plane of opening 5 as indicated in Fig. 1. The keeper has substantially parallel side arms $6^b$ extending from barrier portions 6 and terminating in an interconnecting loop portion $6^c$ which is arcuate in form substantially to fit the contour of front head D.

When the loop portion is close against front head D as shown in all the figures of the drawing, the barrier portions 6 are across the ends of opening 5 so that retainer block 4 cannot be removed. The keeper is arranged to be releasably latched in this position by forming the loop portion $6^c$ in a circular segment of more than 180° providing inwardly projecting parts $6^d$ which are spaced apart a distance less than the diameter of the front head. This causes the loop portion $6^c$ to have a gripping effect on front head D. This gripping effect is released by pulling upon loop $6^c$ whereupon the latching projections $6^d$ are sprung outwardly permitting the keeper to be swung on its pivots or trunnions 6ª to the broken line position shown in Fig. 1. In this position the barrier portions 6 no longer cover the ends of the retainer opening 5 and block 4 can be pushed out to release the working tool. When inserting another tool, the latter is shoved into its chuck until collar c is inwardly of and beyond opening 5. Retainer block 4 is then inserted and the keeper is snapped back into locking position with loop 6ᶜ in close engagement with front head D.

In order to prevent the keeper from being struck by the material being worked upon, which might cause the keeper to be forced out of position, the front head D has an enlargement d which extends outwardly in a transverse direction from front head D a sufficient amount to protect at least the barrier and pivot portions 6 and 6ª, respectively, of the keeper.

While a preferred form of the invention has been herein shown and described, it is to be understood that the invention is not limited to the specific details thereof, but covers all changes, modifications and adaptations within the scope of the appended claims.

I claim as my invention:

1. The combination with a percussive machine having a chuck for receiving a collared working tool, said chuck having a transverse bore, of means for retaining the working tool within said chuck comprising a member within said bore to be engaged by the collar on the tool, and a keeper in the form of a bail straddling said chuck to present a barrier at the opposite ends of said bore, said bail being pivotally mounted on said chuck in the transverse plane of said bore.

2. The combination with a percussive machine having a front head serving as a chuck for a collared working tool, said front head having a transverse bore, a retainer block in said bore in position to be engaged by the collar on the working tool, and a keeper member pivotally mounted on said head and having parts disposed opposite the ends of said bore to keep said block in place.

3. The combination with a percussive machine having a front head serving as a chuck for a collared working tool, said front head having a transverse bore, a retainer block in said bore in position to be engaged by the collar on the working tool, and a keeper member having parts disposed on opposite sides of said head to form barriers at the ends of said bore, said parts having inturned ends received in sockets in said head for pivotally mounting said keeper, said parts being united by a bail portion arranged to grip said head for yieldingly holding said keeper in block retaining position.

4. The combination with a percussive machine having a front head serving as a chuck for a collared working tool, said front head having a transverse bore, a retainer block in said bore in position to be engaged by the collar on the working tool, and a keeper member having parts disposed on opposite sides of said head to form barriers at the ends of said bore, said parts having inturned ends received in sockets in said head for pivotally mounting said keeper, said parts being united by a bail portion having opposed inbent sections arranged to be sprung over said head yieldingly to hold said keeper in block retaining position.

5. The combination with a percussive machine having a front head serving as a chuck for a collared working tool, said front head having a transverse bore, a retainer block in said bore in position to be engaged by the collar on the working tool, a keeper member having parts disposed on opposite sides of said head to form barriers at the ends of said bore, said parts having inturned ends received in sockets in said head for pivotally mounting said keeper, said parts being united by a bail portion arranged to grip said head for yieldingly holding said keeper in block retaining position, and means for protecting the pivot ends of said keeper from contact with the material worked upon.

Signed by me at Detroit, in the county of Wayne and State of Michigan this 19th day of April, 1927.

EDWARD W. STEVENS.